(12) United States Patent
Mazer et al.

(10) Patent No.: US 6,356,582 B1
(45) Date of Patent: Mar. 12, 2002

(54) UNIVERSAL SERIAL BUS TRANSCEIVER

(75) Inventors: Lawrence S. Mazer, San Jose; Simon T. Szeto, Fremont, both of CA (US)

(73) Assignee: Micrel, Incorporated, San Jose, CA (US)

( * ) Notice: Subject to any disclaimer, the term of this patent is extended or adjusted under 35 U.S.C. 154(b) by 0 days.

(21) Appl. No.: 09/196,713

(22) Filed: Nov. 20, 1998

(51) Int. Cl.[7] .............................. H04B 1/38; H04L 5/16
(52) U.S. Cl. ......................................... 375/219; 710/52
(58) Field of Search ................................. 375/219, 220, 375/221, 222; 326/30, 86, 82; 710/29, 31, 38, 36, 52, 131

(56) References Cited

U.S. PATENT DOCUMENTS

| 5,430,396 | A | * | 7/1995 | Morano .................. 326/90 |
| 5,539,771 | A | * | 7/1996 | Noda et al. ................ 375/219 |
| 5,675,584 | A | * | 10/1997 | Jeong ......................... 370/284 |
| 5,781,028 | A | | 7/1998 | Decuir ........................ 326/30 |
| 5,838,722 | A | * | 11/1998 | Consi ......................... 375/219 |
| 5,929,655 | A | * | 7/1999 | Roe et al. .................... 326/82 |
| 6,237,805 | B1 | * | 3/2000 | Kuroda et al. .............. 326/101 |
| 6,212,224 | B1 | * | 4/2001 | Cammarota et al. ........ 375/219 |

FOREIGN PATENT DOCUMENTS

| DE | 197 15 455 | 10/1998 | .......... G06F/13/38 |
| WO | WO 98/26354 | 6/1998 | .......... G06F/13/40 |

* cited by examiner

Primary Examiner—Chi Pham
Assistant Examiner—Phuong Phu
(74) Attorney, Agent, or Firm—Skjerven Morrill MacPherson LLP; Brian D. Ogonowsky; Daniel P. Stewart

(57) ABSTRACT

A universal serial bus transceiver is disclosed. In one embodiment, the transceiver includes a differential transmitting amplifier with a first input terminal that receives a reference voltage, a second input terminal that receives a first data input signal at a level corresponding to the reference voltage, and a third input terminal that receives a second data input signal at the reference voltage level. The differential transmitting amplifier generates first and second bus data output signal at the bus signal level in response to the first and second data input signals. The transceiver also includes a first receiving amplifier with a first input terminal that receives the reference voltage and a second input terminal that receives a first bus data input signal at the bus signal level. The first receiving amplifier generates a first data output signal at the reference voltage level. Similarly, the transceiver includes a second receiving amplifier with a first input terminal that receives the reference voltage and a second input terminal that receives a second bus data input signal at the bus signal level. The second receiving amplifier generates a second data output signal at the reference voltage level. The disclosed transceiver may reside on a separate chip from the USB controller, eliminating the need for the USB controller to support the universal serial bus signal level. Moreover, the disclosed generic USB transceiver is compatible with a variety of USB controllers utilizing different internal signal levels.

27 Claims, 23 Drawing Sheets

| FIG. 4A-1 | FIG. 4A-2 | FIG. 4A-3 | FIG. 4A-4 |
|---|---|---|---|
| FIG. 4A-5 | FIG. 4A-6 | FIG. 4A-7 | FIG. 4A-8 |

BIAS

VIAMP

VIAMP2

LVLSHFT

CLAMPL

CLAMPH

POP

SCHM

RCV

UNIVERSAL SERIAL BUS TRANSCEIVER

TECHNICAL FIELD OF THE INVENTION

The present invention relates to personal computers, and in particular to a universal serial bus transceiver.

BACKGROUND OF THE INVENTION

A standard has been developed for a universal serial bus (USB) for personal computers. According to this standard, set forth most recently in Universal Serial Bus Specification Revision 1.1, a universal serial bus transceiver provides logic signals on the bus at a signal level of five volts. In order to achieve this required bus signal level, the transceiver's internal data lines must support voltages as high as 3.8 V.

The transceiver is typically integrated on the same chip with a USB controller. Thus, since smaller chip designs are not capable of handling larger voltages, the required internal transceiver voltage place a practical lower limit of approximately 0.5 microns on the design rule for the USB transceiver and controller. This lower limit severely restricts the ability of chip designers to either increase the functionality or reduce the chip size of the USB transceiver and controller. In addition, portable devices such as personal data assistants, palmtop computers and cellular telephones typically have lower system voltages which cannot easily support the required USB voltages.

SUMMARY OF THE INVENTION

Therefore, a need has arisen for a universal serial bus communication system that addresses the disadvantages and deficiencies of the prior art. In particular, a need has arisen for a universal serial bus communication system with separate controller and transceiver chips, to allow lower system voltage on the transceiver chip.

Accordingly, a novel universal serial bus transceiver is disclosed. In one embodiment, the transceiver includes a differential transmitting amplifier with a first input terminal that receives a reference voltage, a second input terminal that receives a first data input signal at a level corresponding to the reference voltage, and a third input terminal that receives a second data input signal at the level corresponding to the reference voltage. The differential transmitting amplifier generates first and second bus data output signal at the bus signal level in response to the first and second data input signals. The transceiver also includes a first receiving amplifier with a first input terminal that receives the reference voltage and a second input terminal that receives a first bus data input signal at the bus signal level. The first receiving amplifier generates a first data output signal at the level corresponding to the reference voltage. Similarly, the transceiver includes a second receiving amplifier with a first input terminal that receives the reference voltage and a second input terminal that receives a second bus data input signal at the bus signal level. The second receiving amplifier generates a second data output signal at the level corresponding to the reference voltage.

In another embodiment of the present invention, a USB-compatible electronic device includes a processor that generates data for transmission on a universal serial bus. The device also includes a universal serial bus controller, residing on a first integrated circuit chip, that receives the data for transmission on the universal serial bus from the processor and provides both a reference voltage and first and second data signals at a signal level associated with the reference voltage in response to the data received from the processor. The device also includes a universal serial bus transceiver, residing on a second integrated circuit chip, that receives the reference voltage and the first and second data signals from the universal serial bus controller and generates, in response to the first and second data signals received from the universal serial bus controller, first and second bus data output signals at a bus signal level that is different from the signal level associated with the reference voltage.

According to still another embodiment of the present invention, a method for communicating data via a universal serial bus includes receiving a controller reference voltage at a differential transmitting amplifier, receiving first and second controller data input signals at a level corresponding to the controller reference voltage at the differential transmitting amplifier, generating first and second bus data output signals at a bus signal level by the differential transmitting amplifier in response to the first and second controller data input signals, the bus signal level being different from the level corresponding to the controller reference voltage, and transmitting the first and second bus data output signals on the universal serial bus.

An advantage of the present invention is that the USB controller and USB transceiver may reside on separate integrated circuit chips, eliminating the need for the USB controller to support the universal serial bus signal level. Another advantage of the present invention is that the USB transceiver may be powered entirely by the universal serial bus voltage, eliminating the need for the power supply for the USB transceiver. Yet another advantage is that the disclosed generic USB transceiver is compatible with a variety of USB controllers utilizing different internal signal levels.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiments of the present invention and their advantages are best understood by referring to FIGS. 1 through 6 of the drawings. Like numerals are used for like and corresponding parts of the various drawings.

Figure 1:
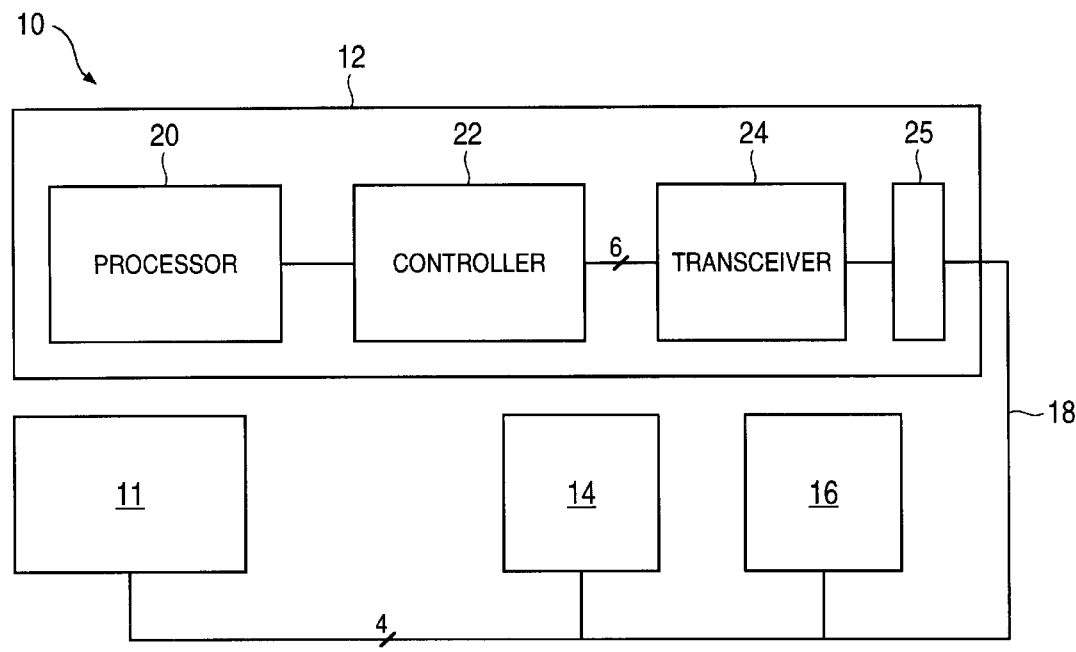
FIG. 1 is a block diagram of a personal computer system constructed in accordance with the present invention.

Referring to FIG. 1, a block diagram of a personal computer system 10 constructed in accordance with the present invention is shown. Personal computer system 10 includes a personal computer 11 connected to peripheral devices 12, 14 and 16 by means of a universal serial bus 18. Each peripheral device 12, 14 and 16 may be, for example, a standard peripheral device such as a printer, keyboard, mouse or monitor, or a mobile device such as a personal data assistant, palmtop computer, or cellular telephone. Personal computer 11 acts as the host for universal serial bus 18.

For ease of illustration, peripheral device 12 will be described as a "function" device on universal serial bus 18, meaning that peripheral device 12 does not provide a hub for the connection of other peripheral devices. However, it will be understood in the following description that peripheral device 12 need not be solely a "function" device.

Peripheral device 12 includes a processor 20 such as an Intel X 86 microprocessor. Processor 20 communicates with a USB controller 22, which controls a USB transceiver 24. In accordance with the present invention, USB controller 22 and USB transceiver 24 reside on separate integrated circuit chips, as will be described more fully below. A USB connector 25 provides a physical connection between USB transceiver 24 and universal serial bus 18. Peripheral devices 14 and 16 each also include a processor, USB controller, USB transceiver and USB connector (not shown) which may be implemented in accordance with the present invention, as in peripheral device 12. Universal serial bus 18 is a four-wire bus carrying data signals D+ and D−, a bus voltage line $V_{BUS}$ and a ground line GND in accordance with USB standards.

Figure 2:
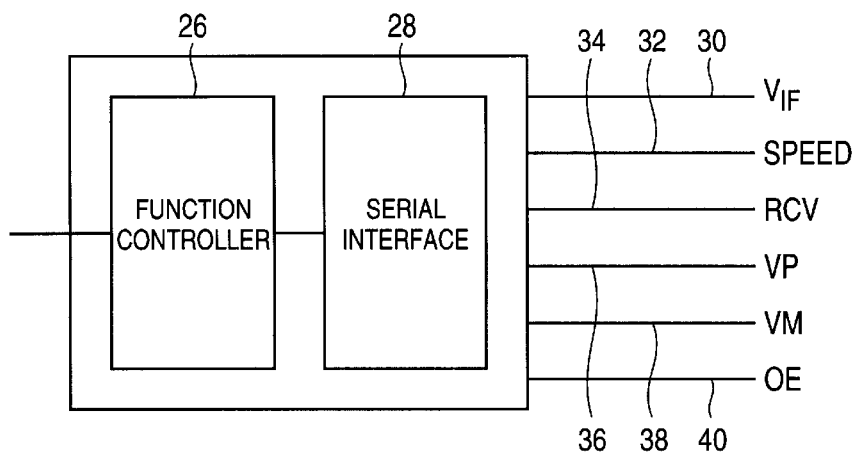
FIG. 2 is a block diagram of a universal serial bus controller for use in the personal computer system.

Referring to FIG. 2, a block diagram of USB controller 22 is shown. USB controller 22 includes a function controller 26 and a serial interface engine 28. USB controller is powered by an external power supply (not shown) which provides a supply voltage $V_{IF}$.

Function controller 26 communicates with processor 20 using an application-specific data protocol. Function controller 26 receives data from processor 20 for transmission on universal serial bus 18. Function controller 26 packages this data into USB-compliant data packets and passes these packets in parallel format to serial interface engine 28. Serial interface engine 28 performs packet ID generation, cyclic redundancy check (CRC) generation and parallel-to-serial conversion on the data packets. Serial interface engine 28 then transmits the data packets on lines 30 through 40 to USB transceiver 24 using non-return to zero inverted (NRZI) data encoding with bit-stuffing in accordance with USB specifications.

Likewise, serial interface engine 28 receives NRZI-encoded, USB-compliant data packets from personal computer 11 via universal serial bus 18 and USB transceiver 24. Serial interface engine 28 performs clock/data separation, NRZI decoding, packet ID decoding and CRC error-checking on the data packets in accordance with USB standards, and performs serial-to-parallel conversion before transmitting the data packets to function controller 26. Function controller 26 in turn transmits the data to processor 20.

Figure 3:
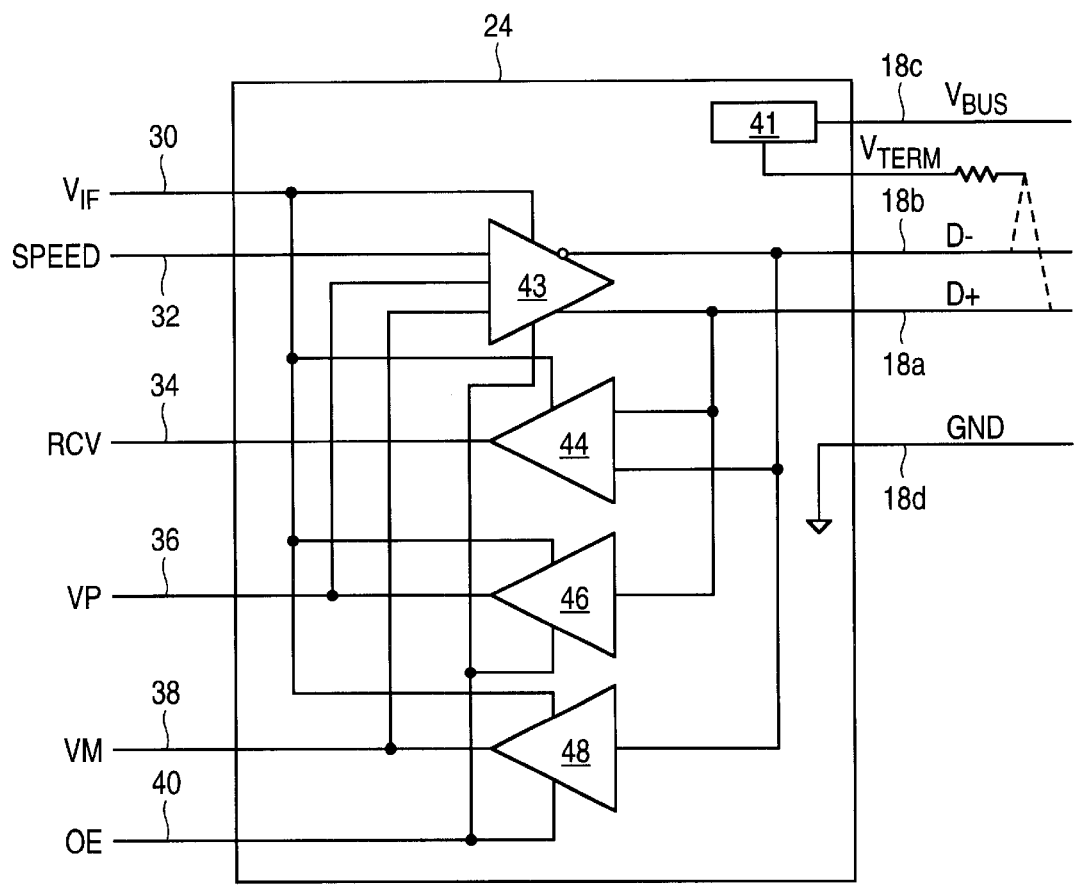
FIG. 3 is a block diagram of a universal serial bus transceiver for use in the personal computer system.

Referring to FIG. 3, a block diagram of USB transceiver 24 is shown. USB transceiver 24 receives the supply voltage of USB controller 22 as a reference voltage $V_{IF}$ via line 30. This reference voltage allows USB transceiver 24 to provide a signal level transition between the required universal serial bus signal level of five volts and the internal logic signal level of USB controller 22, as will be described more fully below.

USB transceiver 24 receives a SPEED signal from USB controller 22 via line 32. The SPEED signal determines the slew rate of a transmitting amplifier 43. When the SPEED signal is high, data communication on universal serial bus 18 is to occur at 12 Mbps, while a low SPEED signal indicates that data communication on universal serial bus 18 is to occur at 1.5 Mbps. Thus, when the SPEED signal is high, transmitting amplifier 43 has an output slew time between 4 and 20 nanoseconds. When the SPEED signal is low, transmitting amplifier 43 has an output slew time between 75 and 300 nanoseconds.

USB transceiver 24 receives serialized data packets as previously described from serial interface engine 28 of USB controller 22 via data lines 36 and 38. The data signals on lines 36 and 38 are designated $V_P$ and $V_M$, respectively. $V_P$ and $V_M$ are complementary logic signals corresponding to data signals D+ and D−, respectively, on universal serial bus 18, as will be described more fully below.

USB transceiver 24 receives an output enable signal (OE#) from USB controller 22 via line 40. This logic signal determines whether USB transceiver 24 is currently transmitting or receiving signals on universal serial bus 18.

USB transceiver 24 receives a universal serial bus supply voltage $V_{BUS}$, which may provide power for USB transceiver 24 and other circuitry in peripheral device 12. This supply voltage is provided by another device on universal serial bus 18, such as personal computer 11.

A voltage regulator 41 receives the supply voltage $V_{BUS}$ and distributes power to the circuitry in USB transceiver 24. Voltage regulator 41 also generates a regulated voltage $V_{TERM}$ between 3.0 and 3.6 volts. This regulated voltage is used to terminate an external speed sense resistor 42, which is connected to either the D+ or D− bus data line. If speed sense resistor 42 is connected to the D+ data line, then USB transceiver 24 is set for 12 Mbps operation. If speed sense resistor 42 is connected to the D− data line, then USB transceiver 24 is set for 1.5 Mbps operation.

A ground-level voltage GND is received on bus line 18d. Bus line 18d is connected to local ground at USB transceiver 24 to provide a common ground.

Signals $V_P$ and $V_M$ are supplied to the inputs of a transmitting amplifier 43, which produces complementary output signals D+ and D− on universal serial bus data lines 18a and 18b, respectively, in accordance with USB specifications. Transmitting amplifier 43 receives reference voltage $V_{IF}$ from USB controller 22 to discriminate the values of input signals $V_P$ and $V_M$. However, because signals $V_P$ and $V_M$ are produced by USB controller 22 at a lower signal level than the USB-specified signal level for signals D+ and D−, transmitting amplifier 43 amplifies its output signals D+ and D− to the required signal level.

Transmitting amplifier 43 also receives the output enable signal OE# from USB controller 22. When signal OE# is low, transmitting amplifier 43 is enabled to produce output signals D+ and D−, while a high OE# signal causes the output of transmitting amplifier 43 to present a high impedance so that incoming signals may be received on data lines 18a and 18b.

Data line 18a carrying signal D+ is provided to the input of a receiving amplifier 46. Receiving amplifier 46 receives output enable signal OE# from USB controller 40, so that the output of receiving amplifier 46 is enabled only when a receiving mode is indicated by output enable signal OE#. Receiving amplifier 46 also receives reference voltage $V_{IF}$ so as to produce a logic output signal $V_P$ at the internal signal level of USB controller 22. Receiving amplifier 46 may be, for example, a simple Schmitt trigger with an output level set by reference voltage $V_{IF}$.

Likewise, data line 18b carrying signal D− is provided to the input of a receiving amplifier 48. Receiving amplifier 48 receives output enable signal OE# from USB controller 40, so that the output of receiving amplifier 48 is enabled only when a receiving mode is indicated by output enable signal OF#. Receiving amplifier 48 also receives reference voltage $V_{IF}$ so as to produce a logic output signal $V_M$ at the internal signal level of USB controller 22. Receiving amplifier 48, like receiving amplifier 46, may be a simple Schmitt trigger with an output level set by reference voltage $V_{IF}$.

Both data lines 18a and 18b are provided to the inputs of a differential receiving amplifier 44, which produces an output signal RCV on line 34. Output signal RCV represents the difference between signals D+ and D−. Thus, when D+ is greater than D−, RCV is HIGH, while RCV is low when D− is greater than D+. Differential receiving amplifier 44 receives reference voltage $V_{IF}$ so as to produce output signal RCV at the internal signal level of USB controller 22.

Figures 4, 4A, 5, 6, 7, 8:
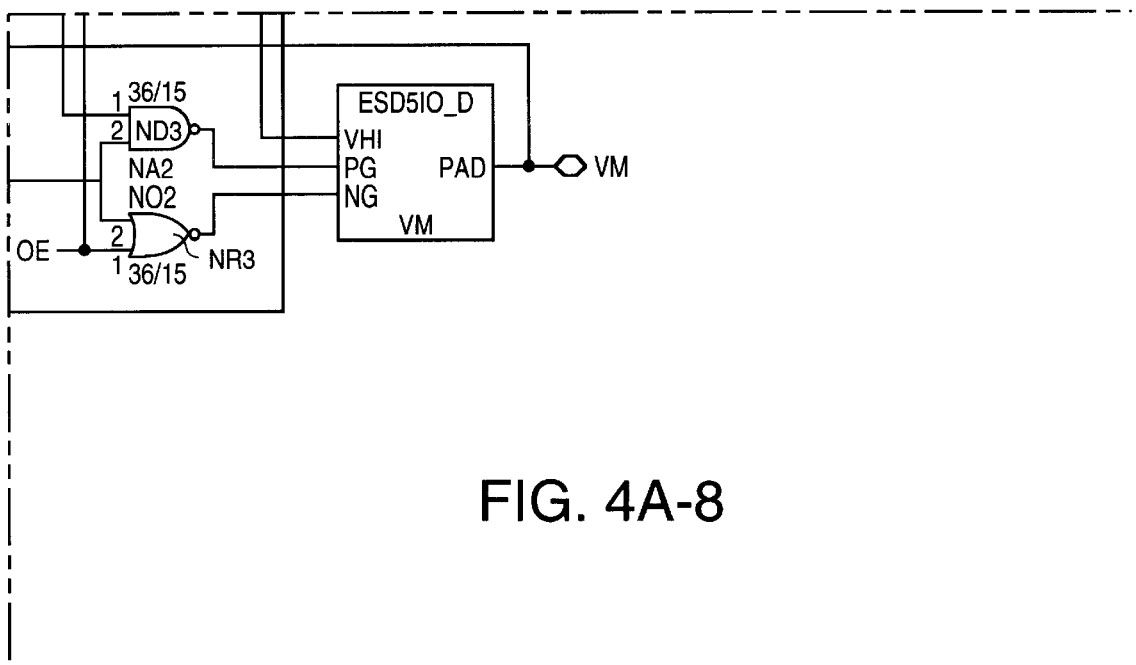
FIG. 4 is a schematic diagram of the universal serial bus transceiver.
Figures 1, 4A:
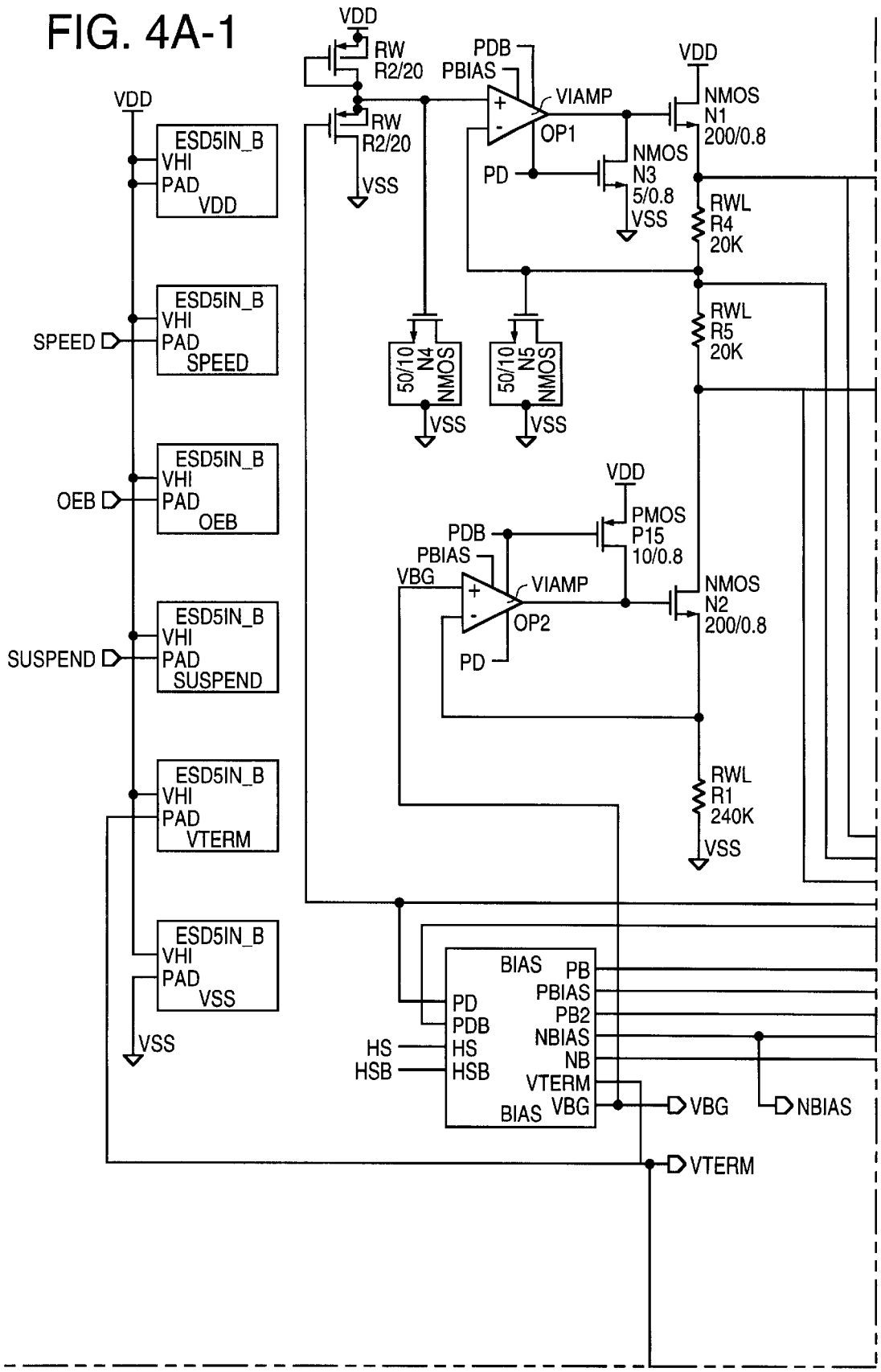
Figures 2, 4A:
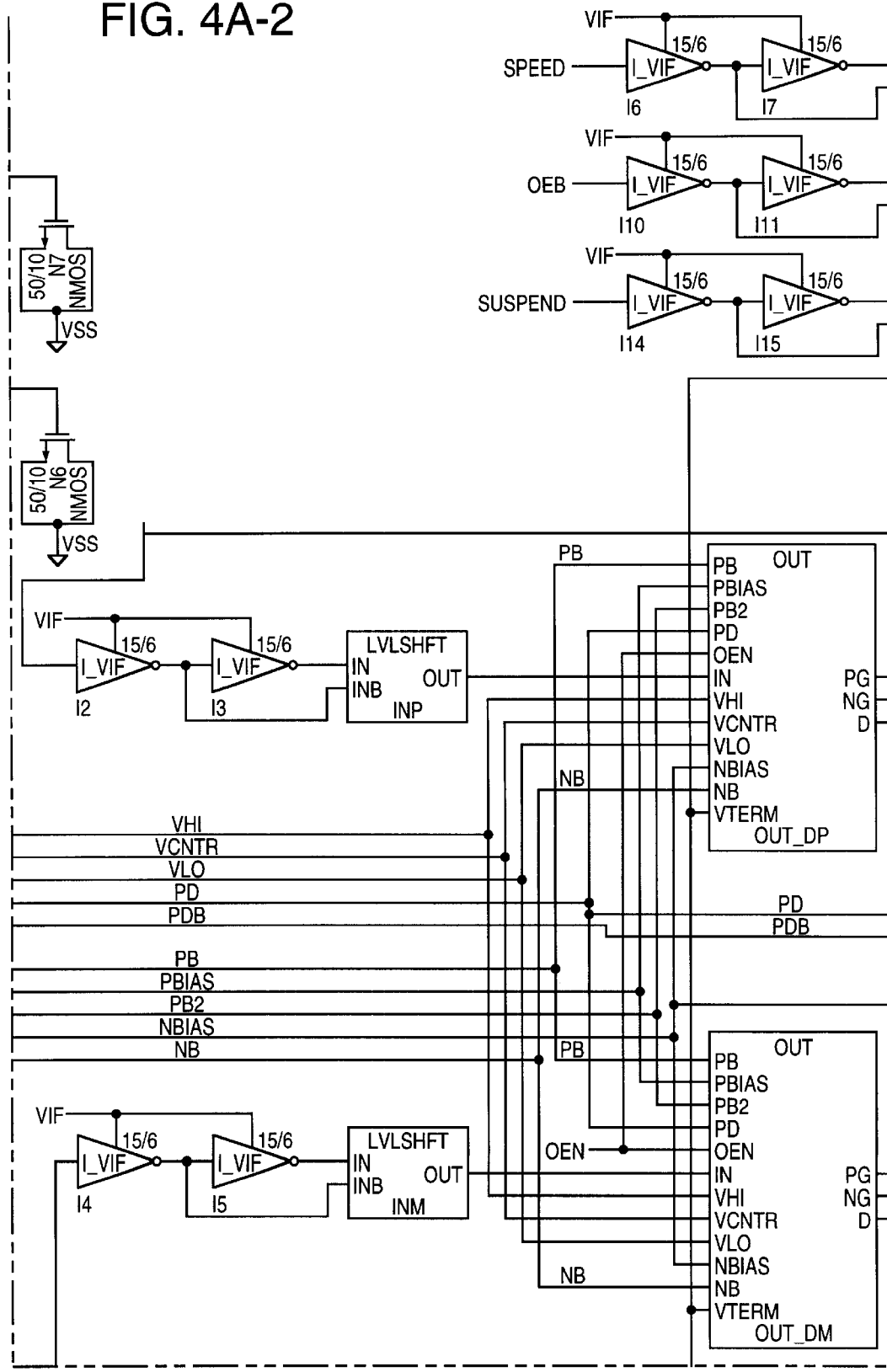
Figures 3, 4A:
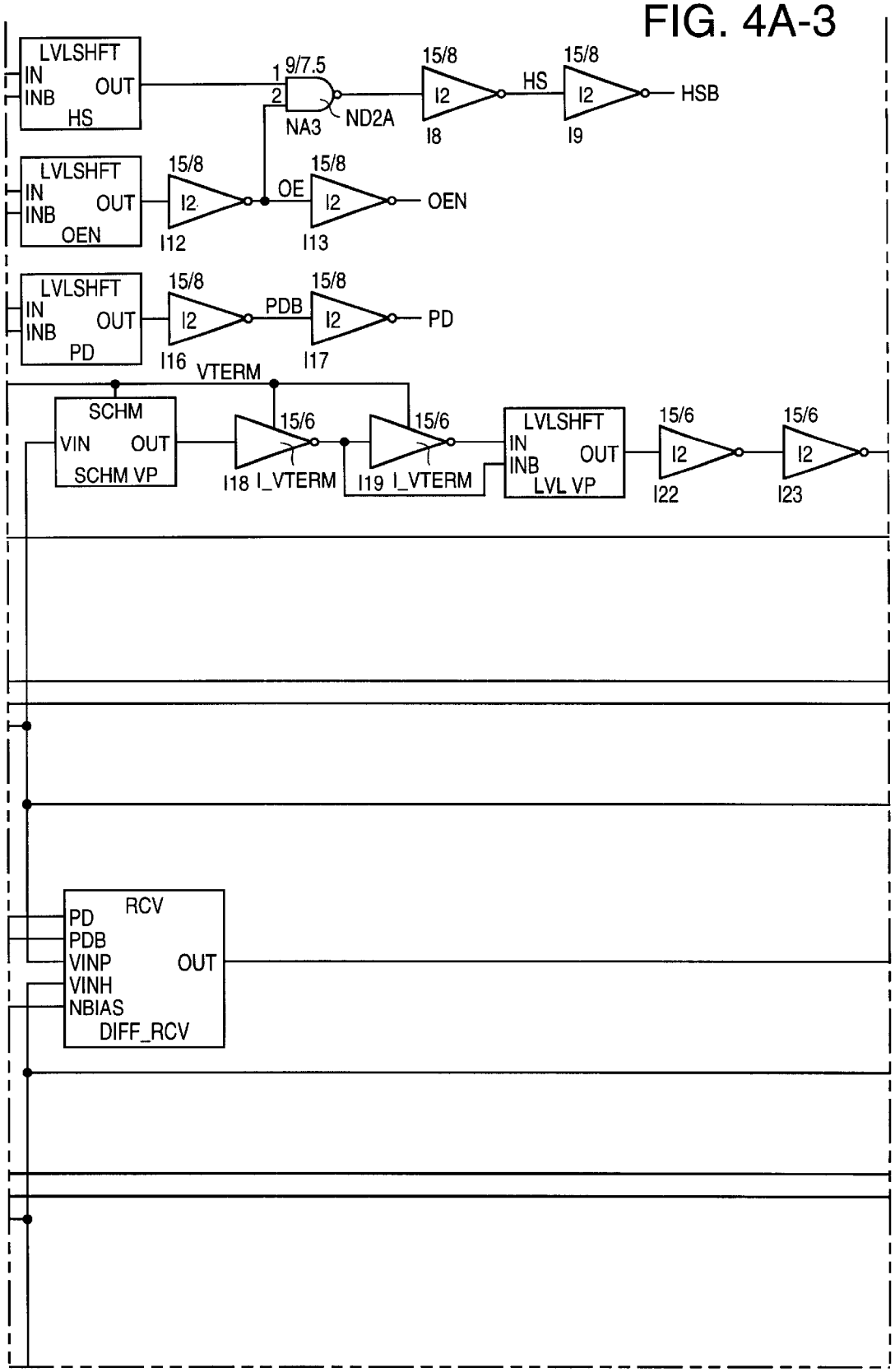
Figures 4, 4A:
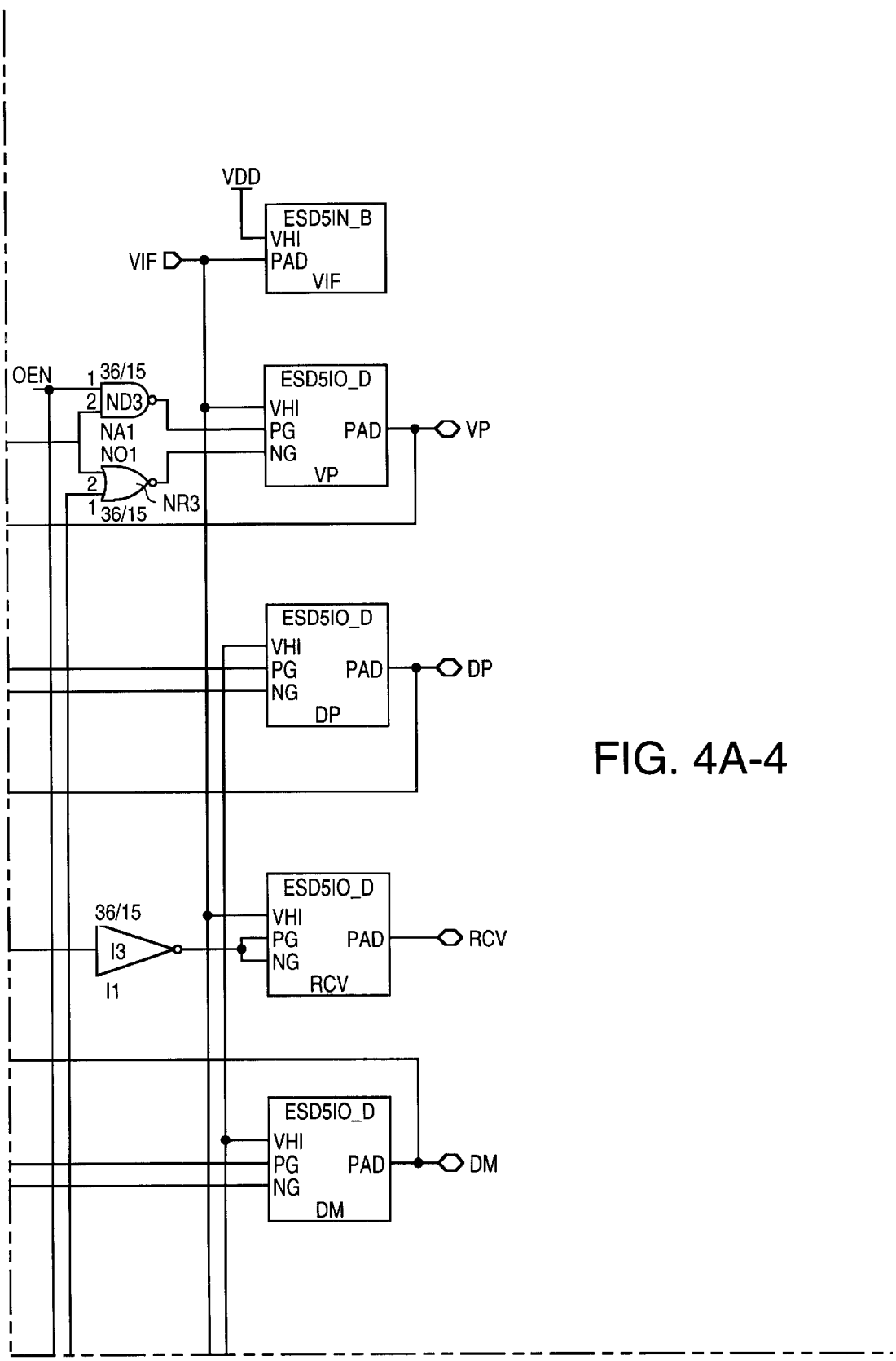
Figures 4, 4A, 5:
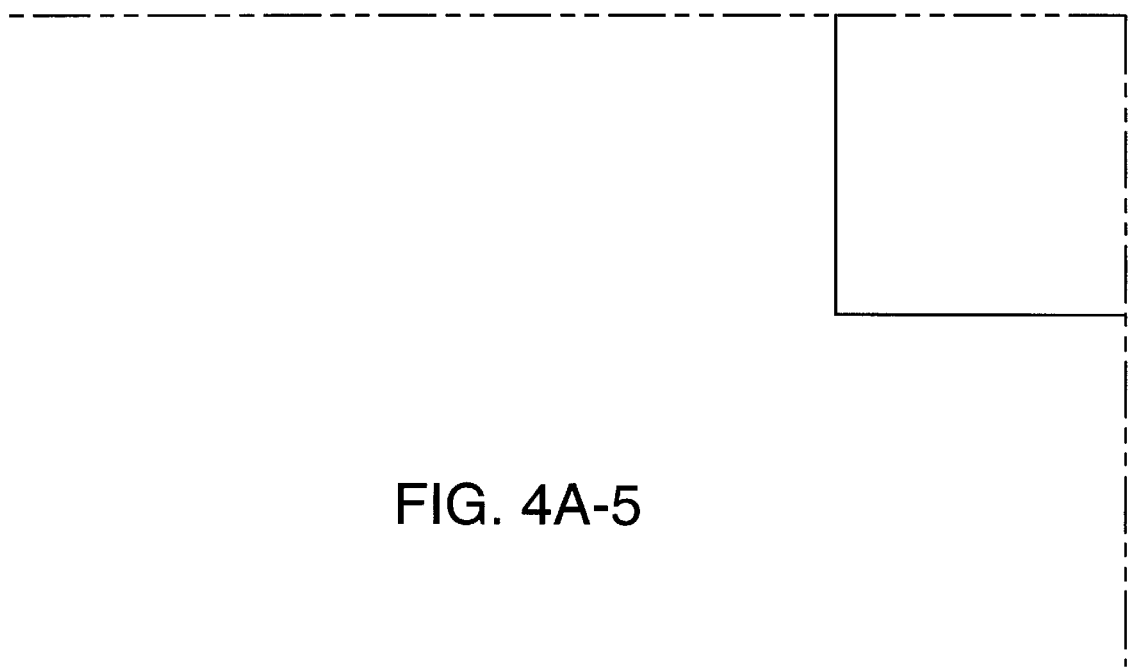
Figures 4, 4A, 5, 6:
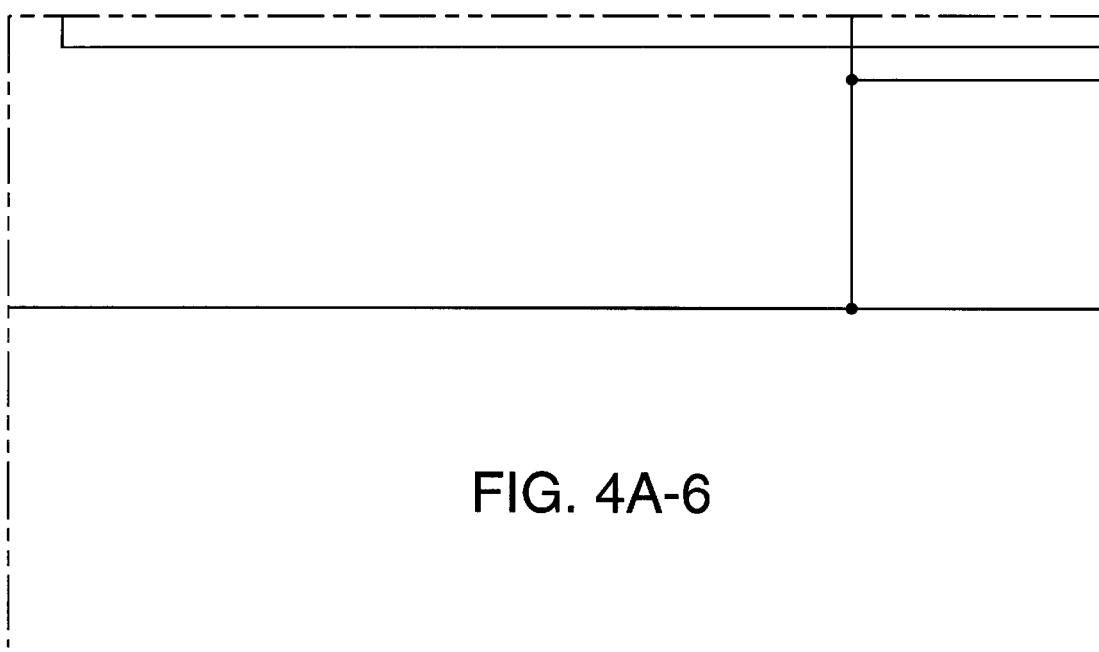
Figures 4, 4A, 5, 6, 7:
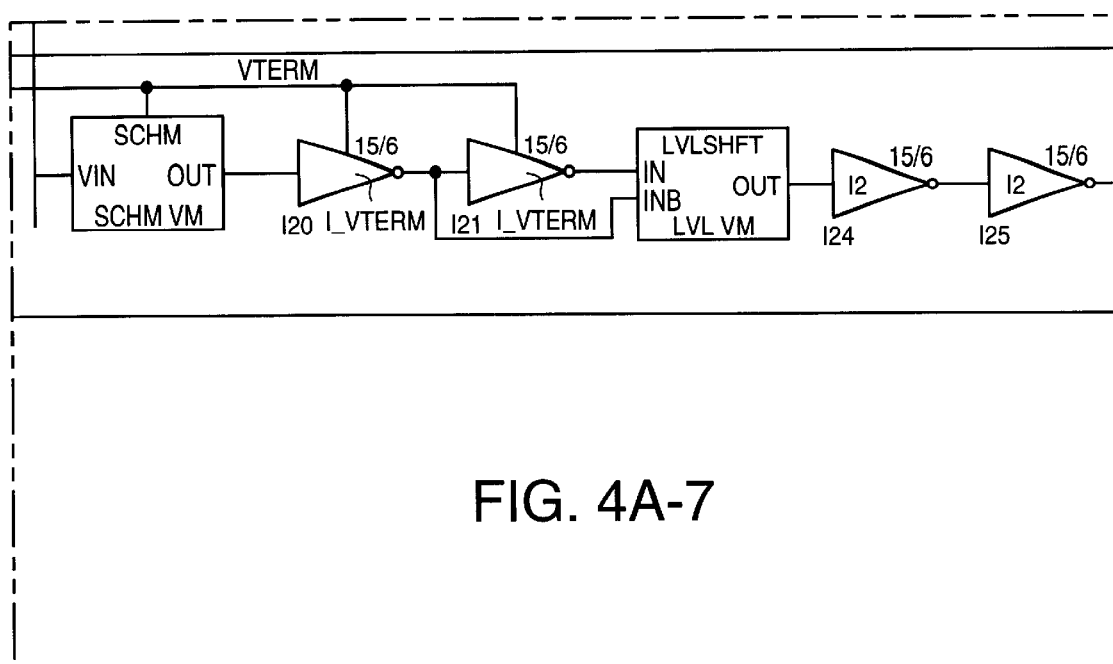
Figure 4B:
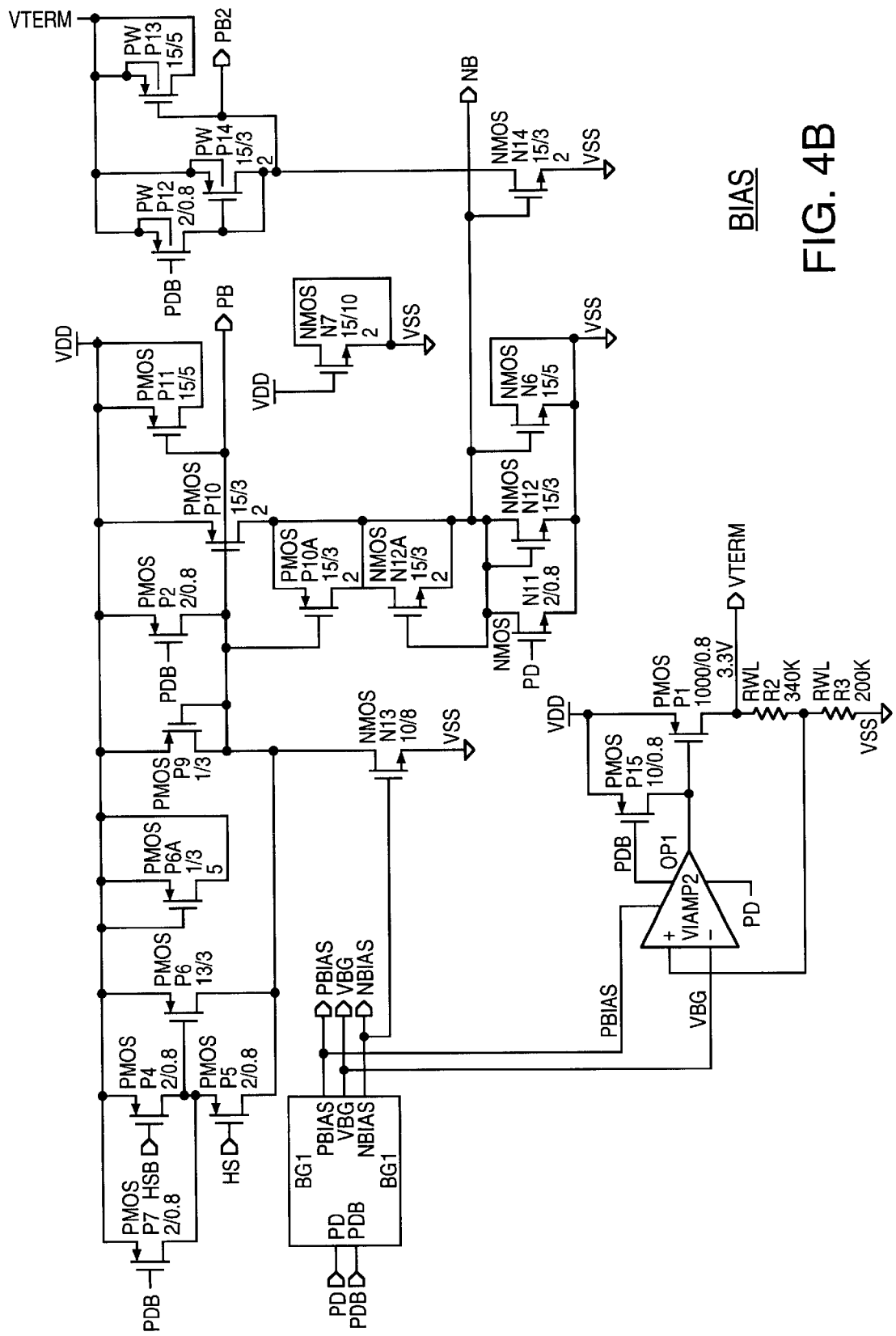
Figure 4C:
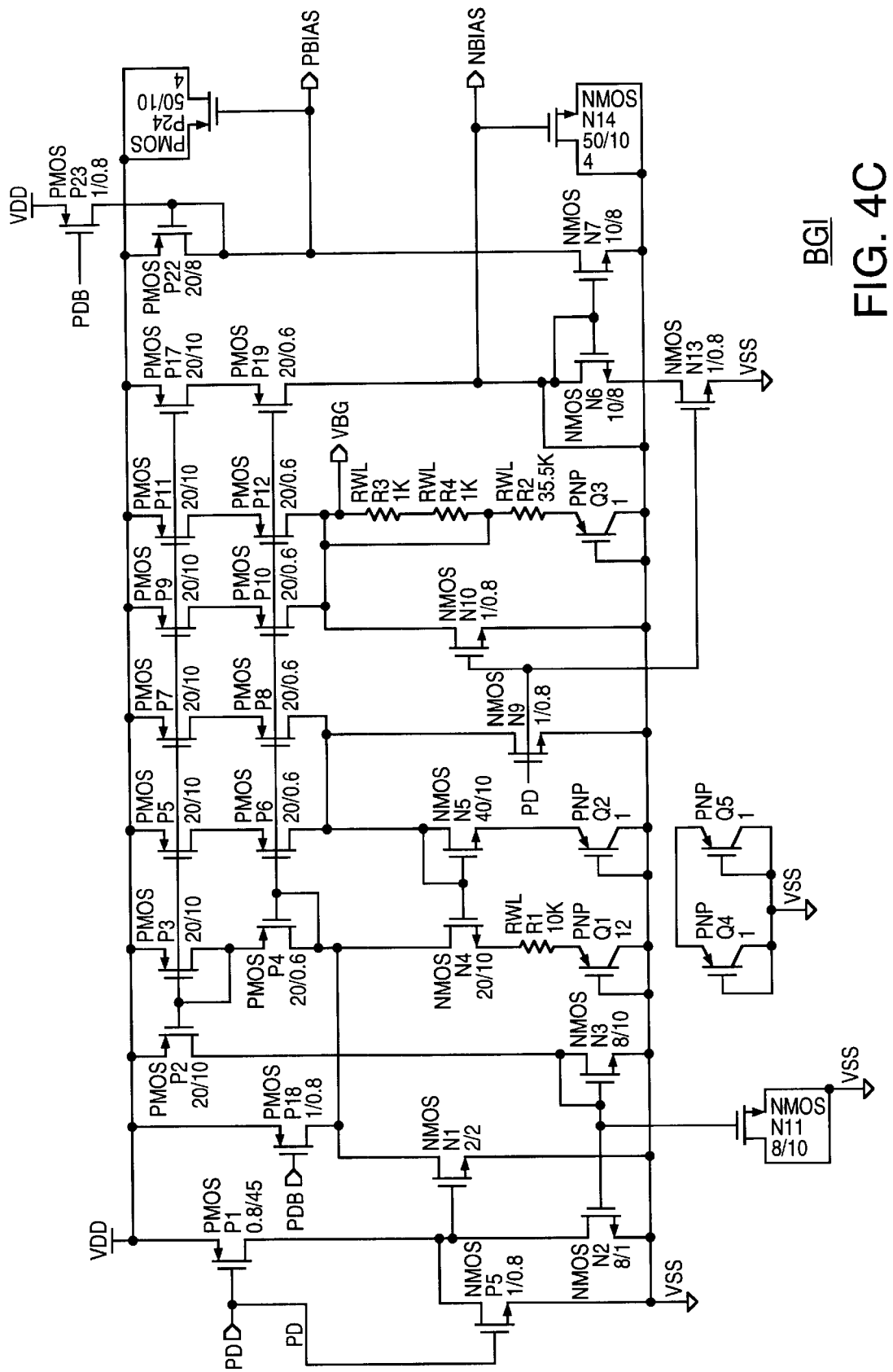
Figure 4D:
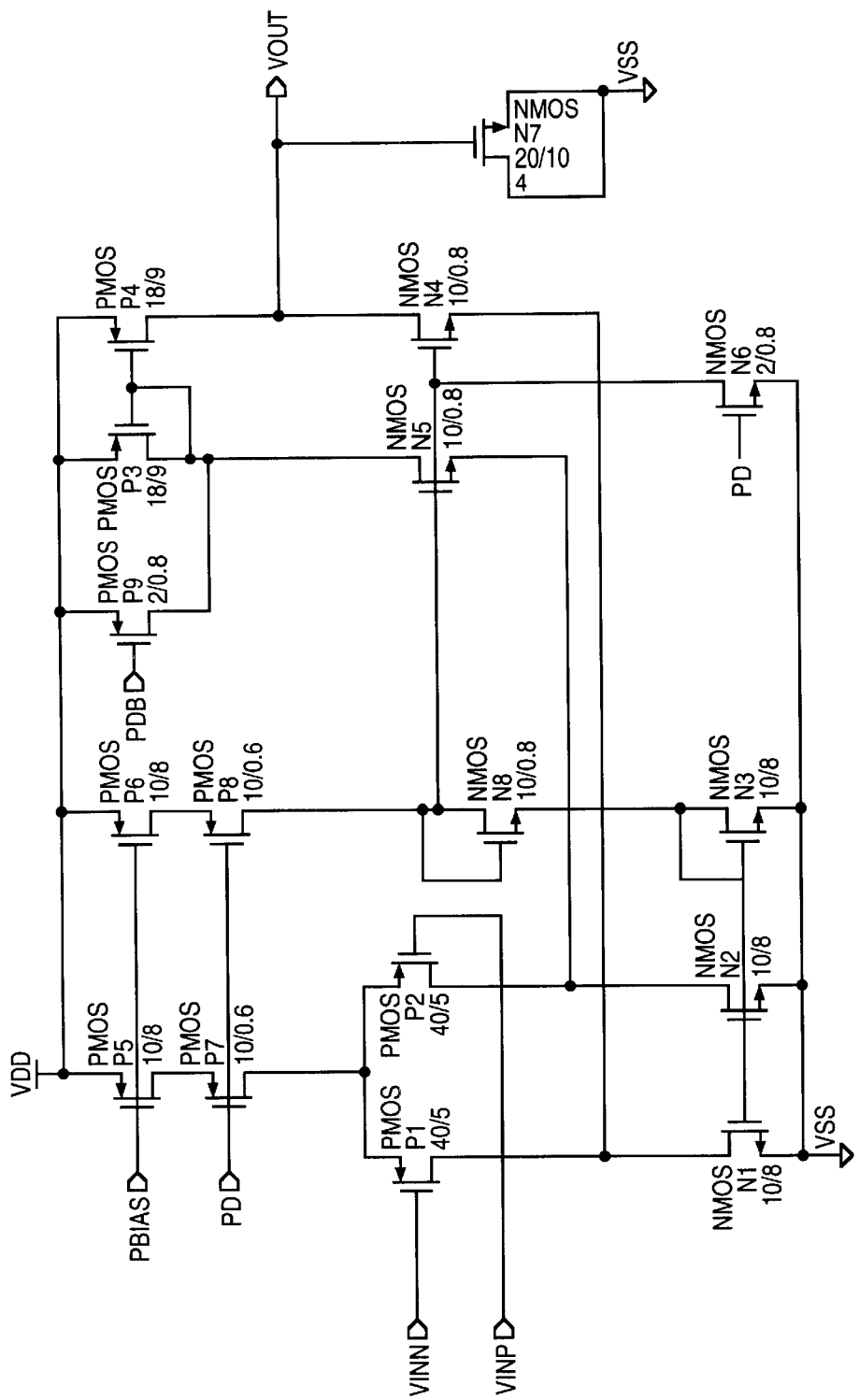
Figure 4E:
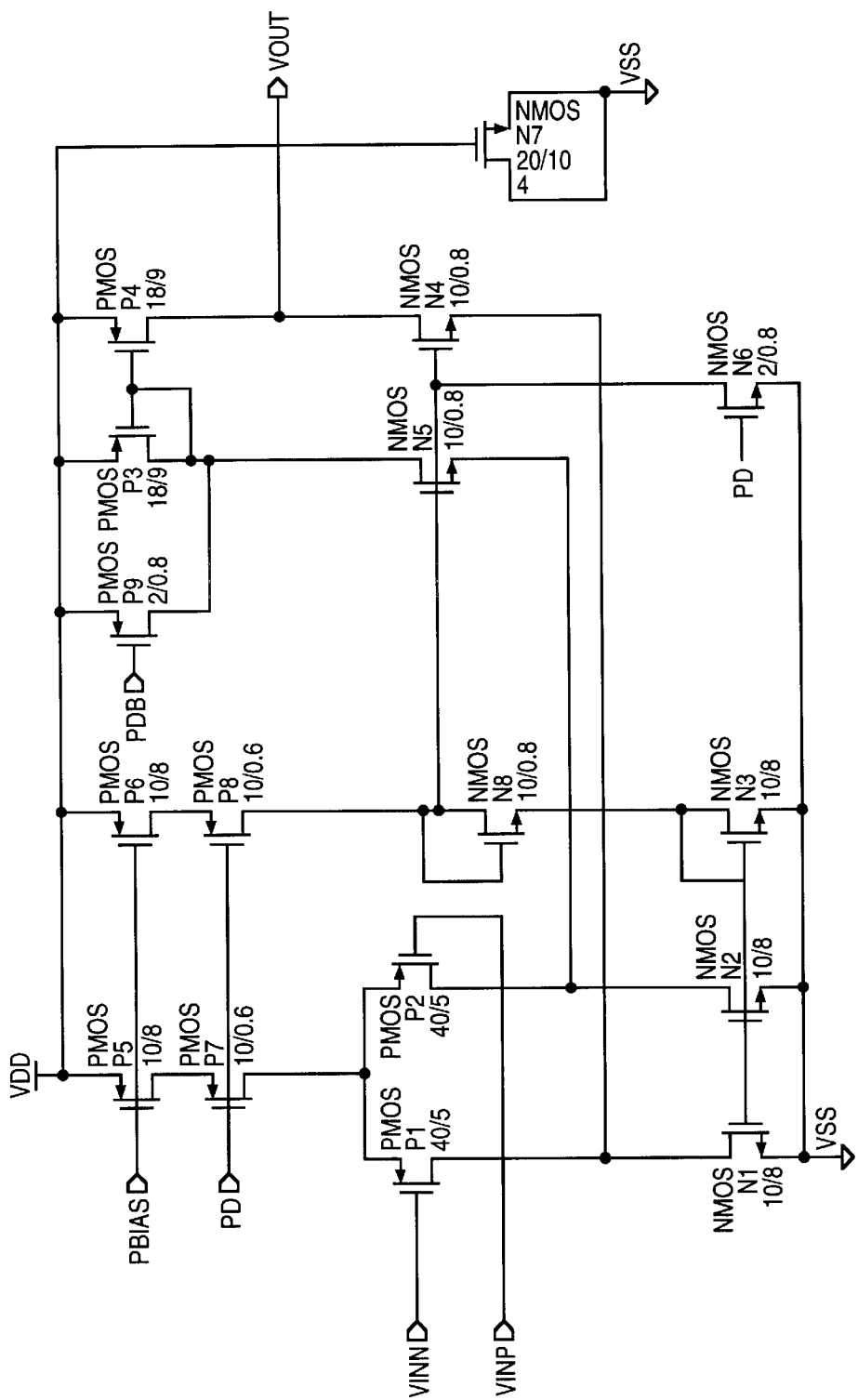
Figure 4F:
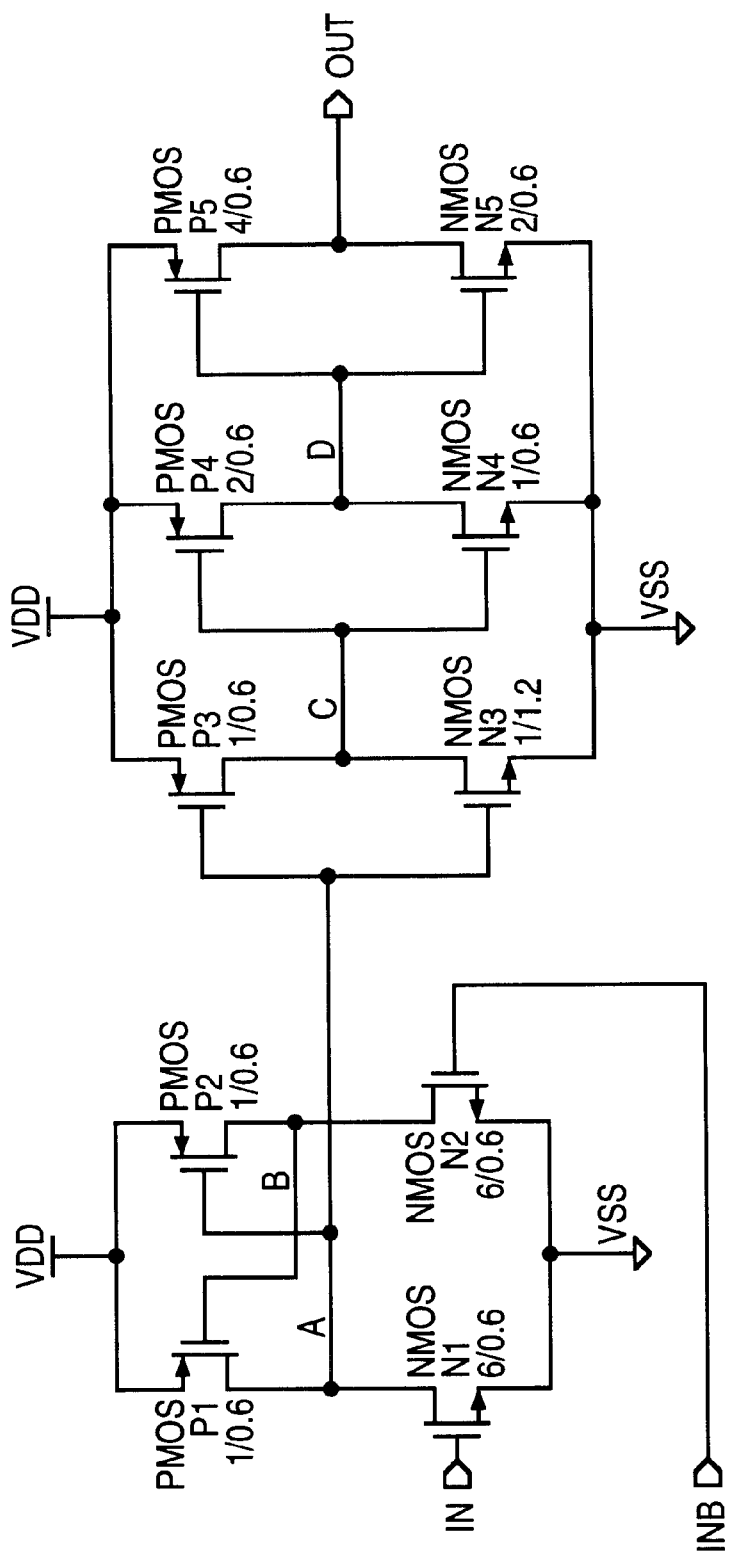
Figure 4G:
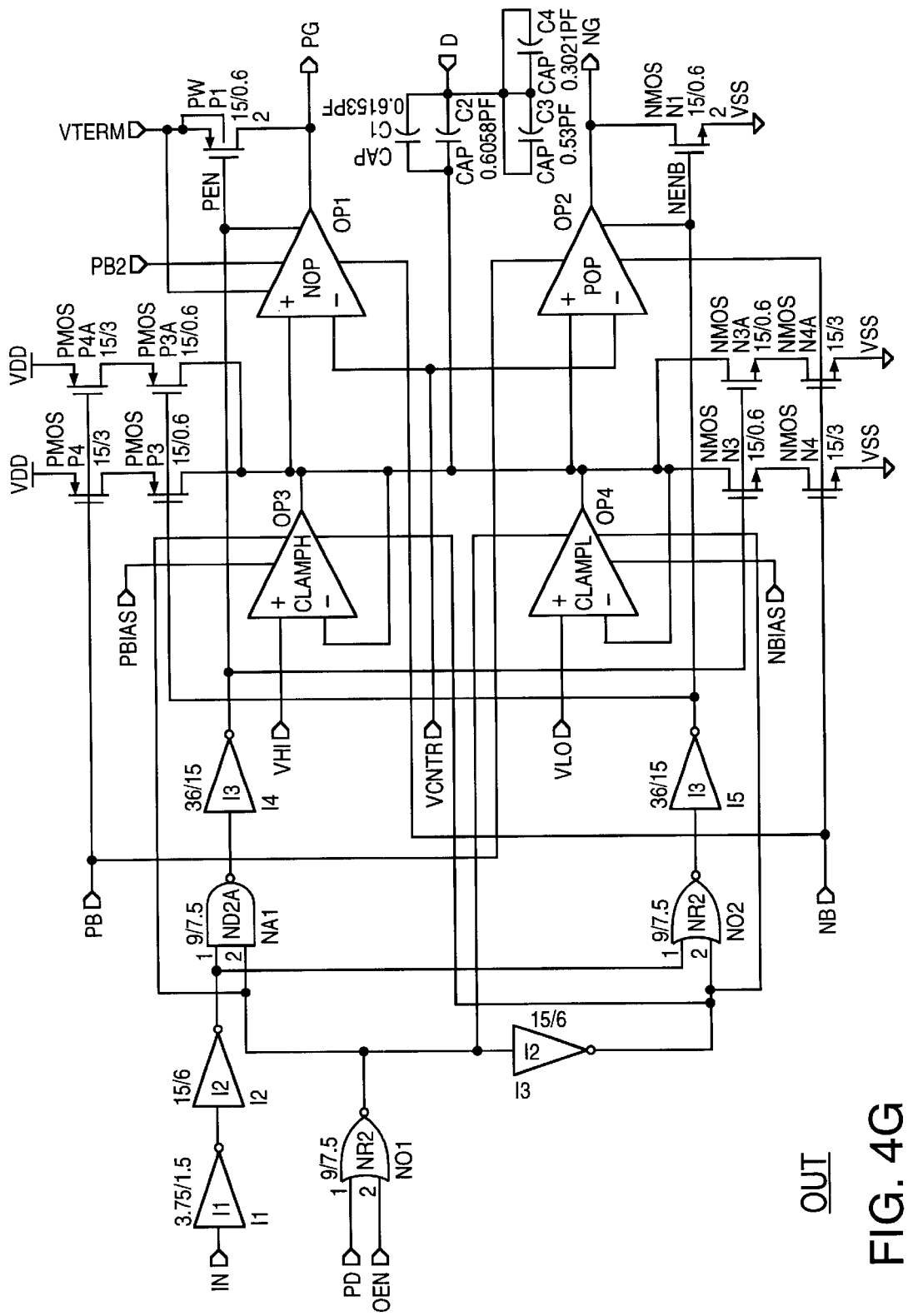
Figure 4H:
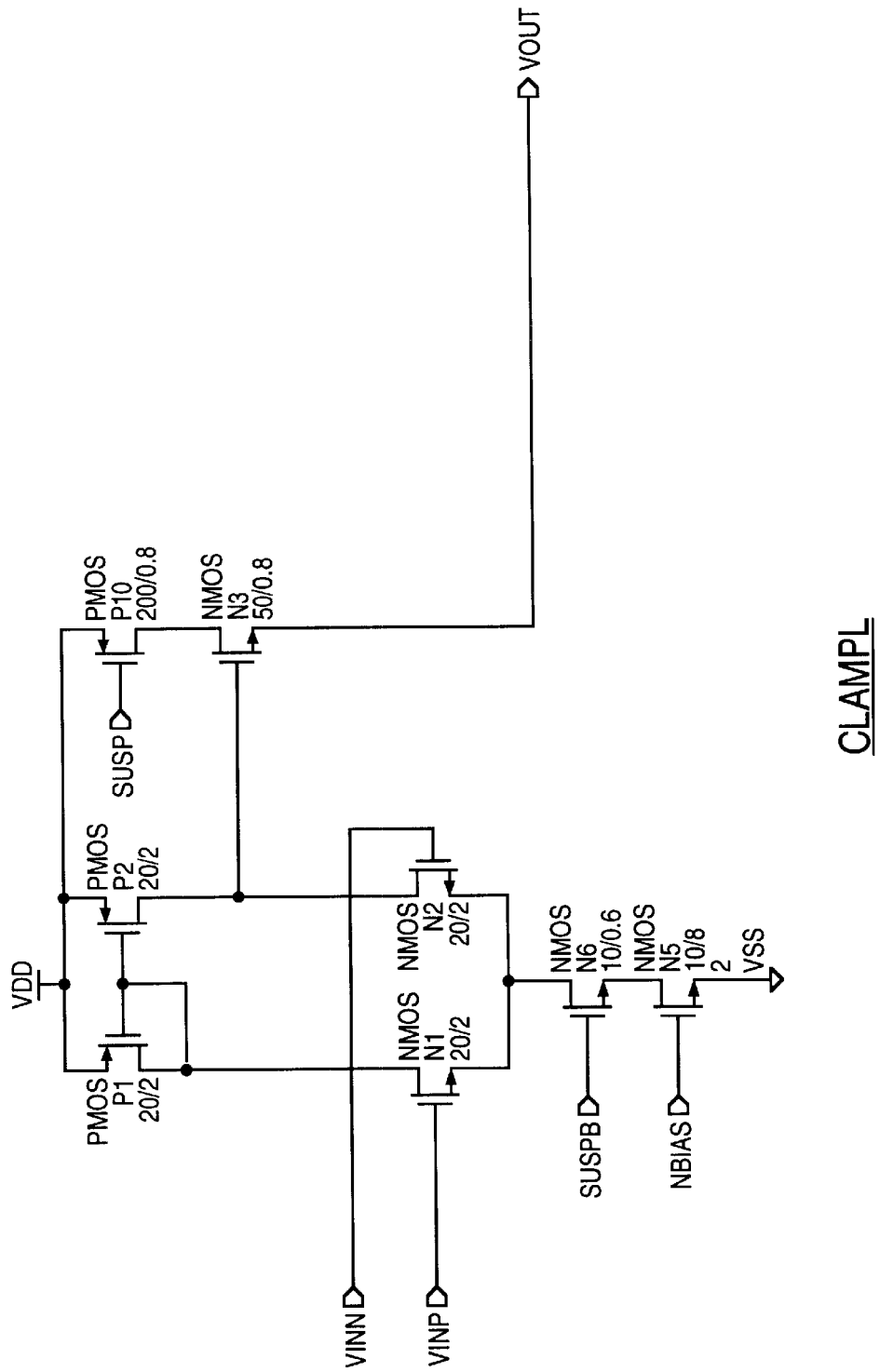
Figure 4I:
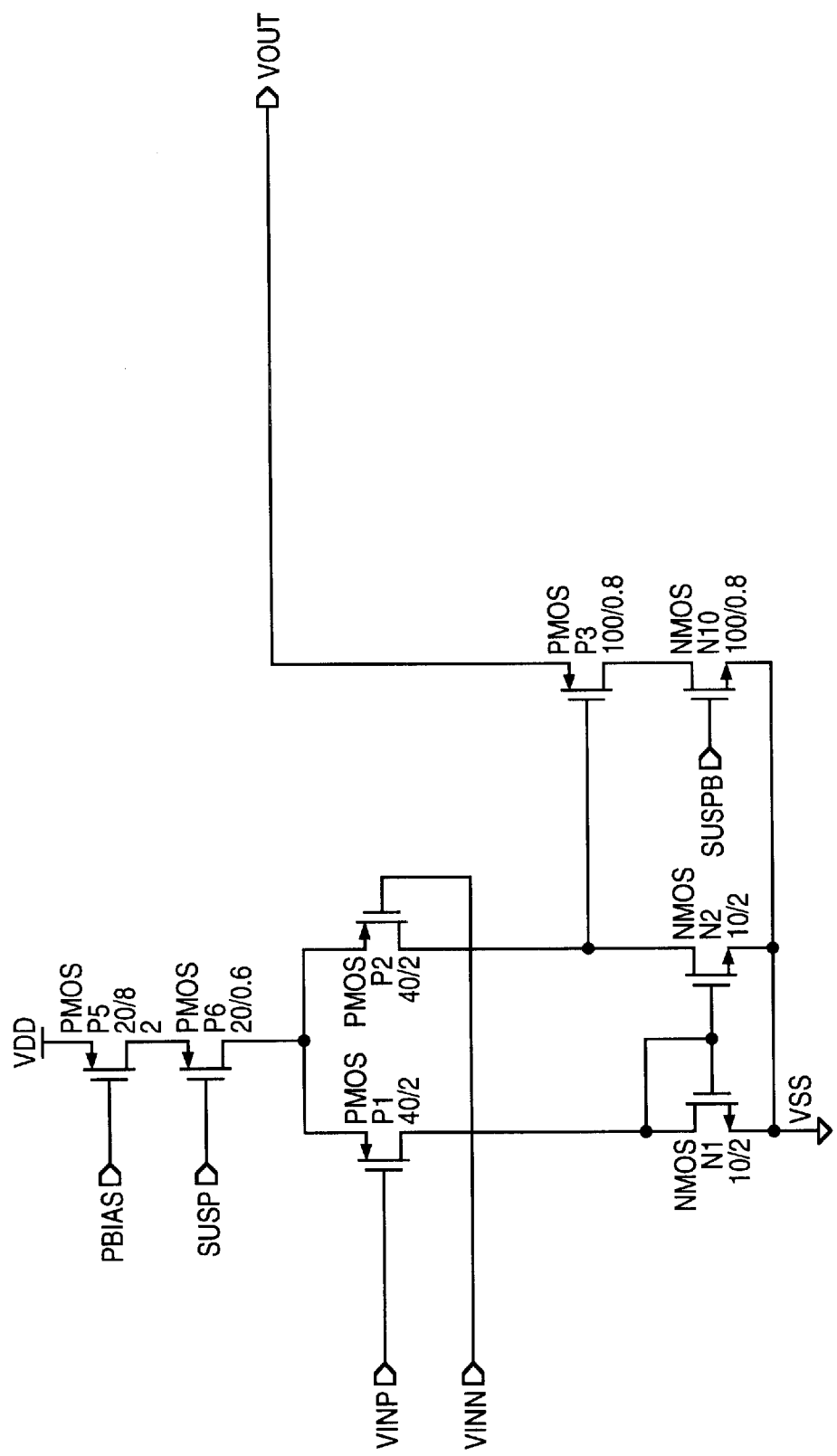
Figure 4J:
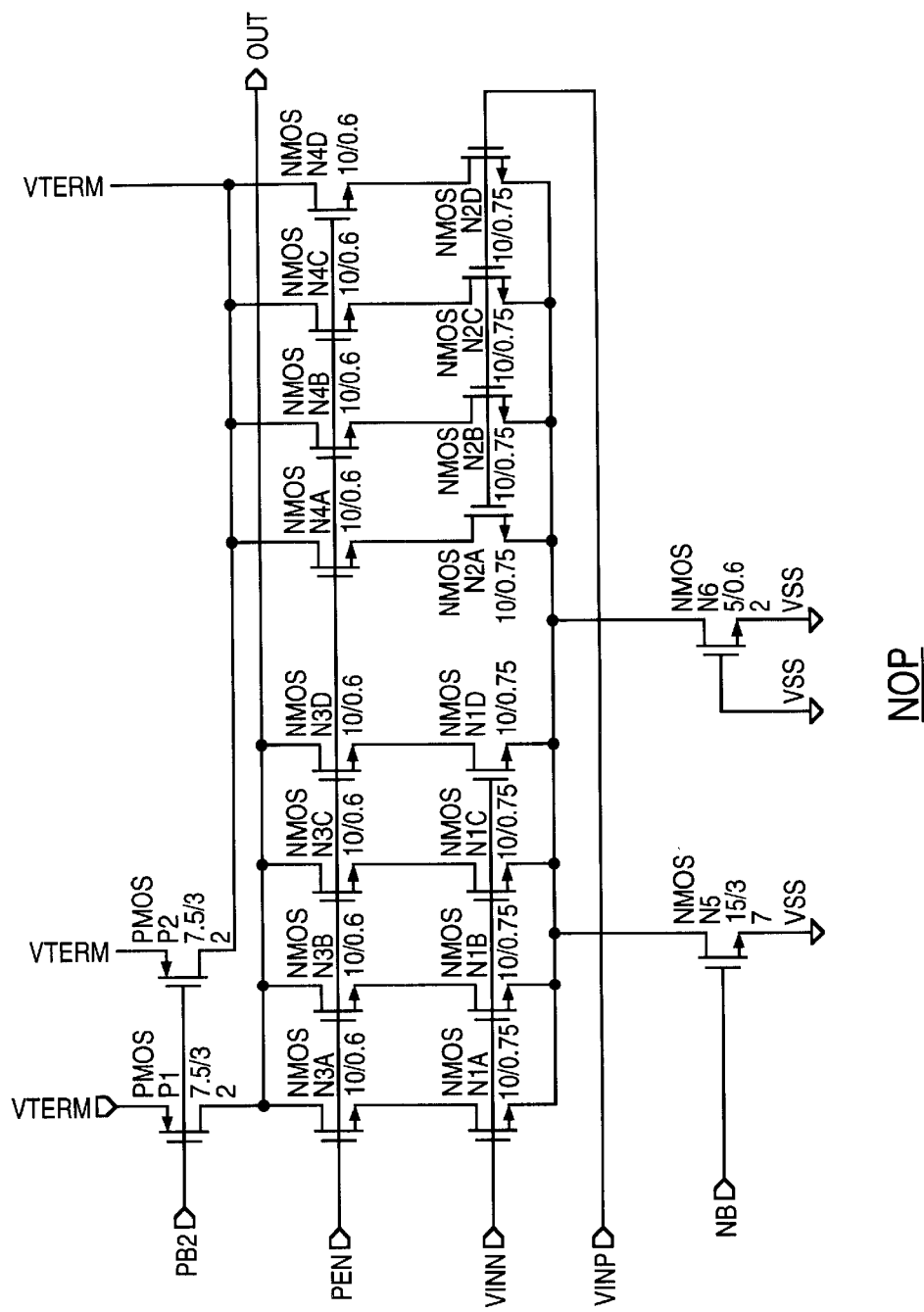
Figures 1, 4K:
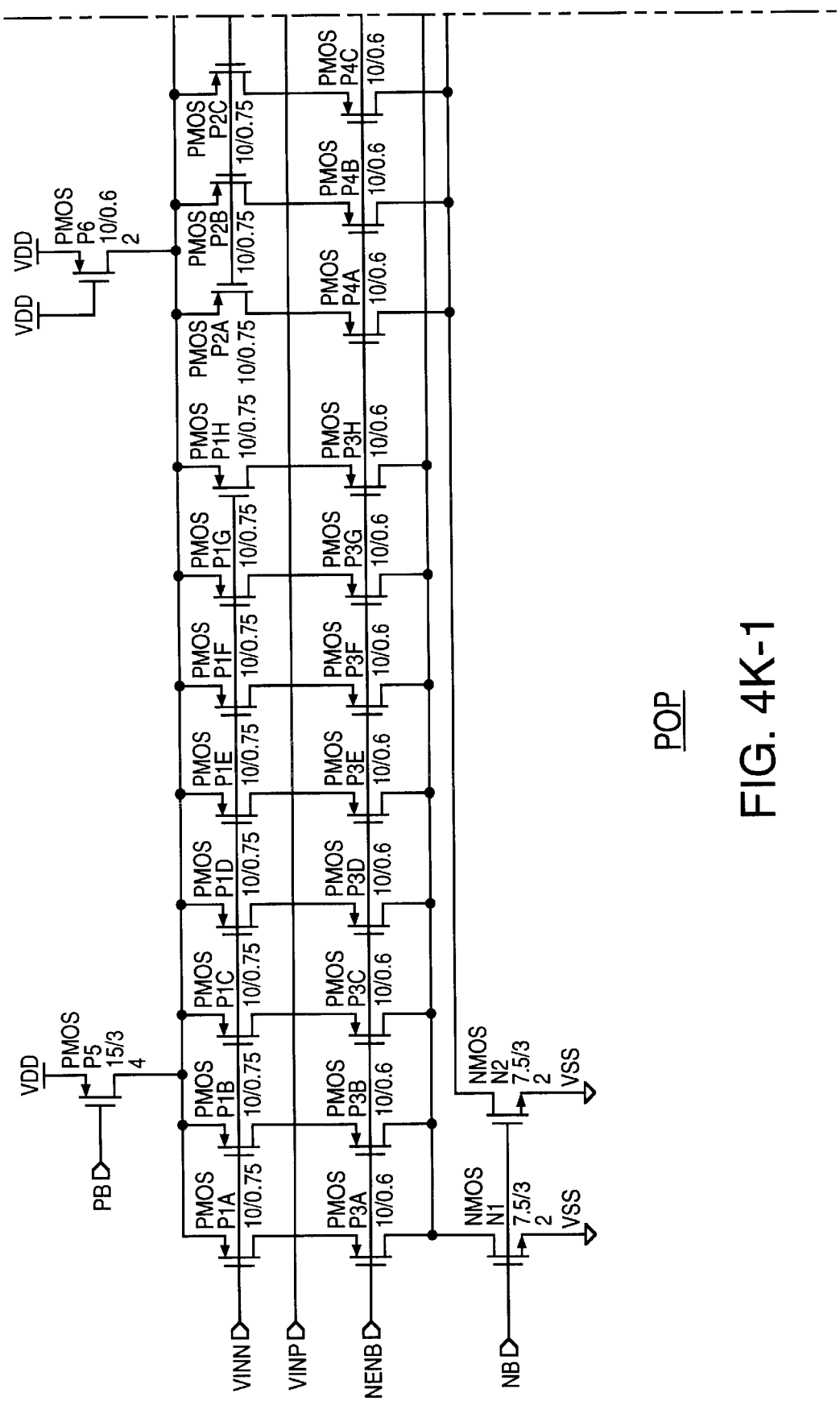
Figures 2, 4K:
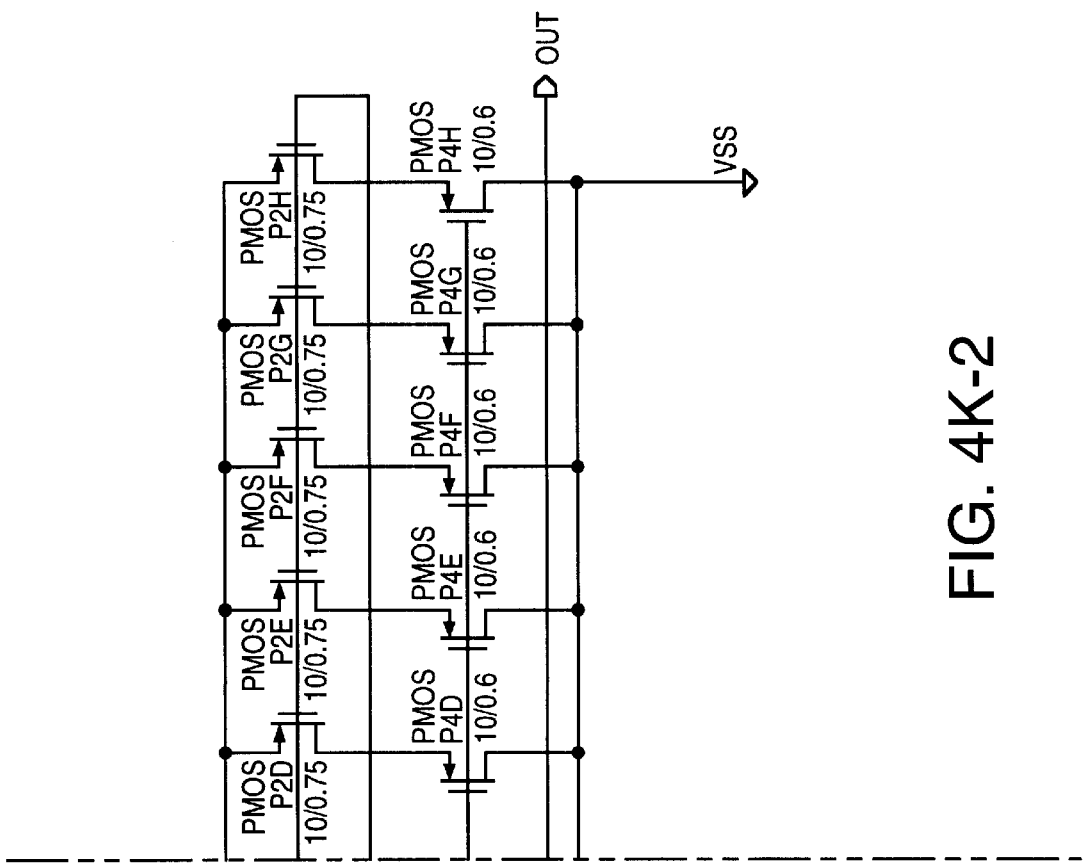
Figure 4L:
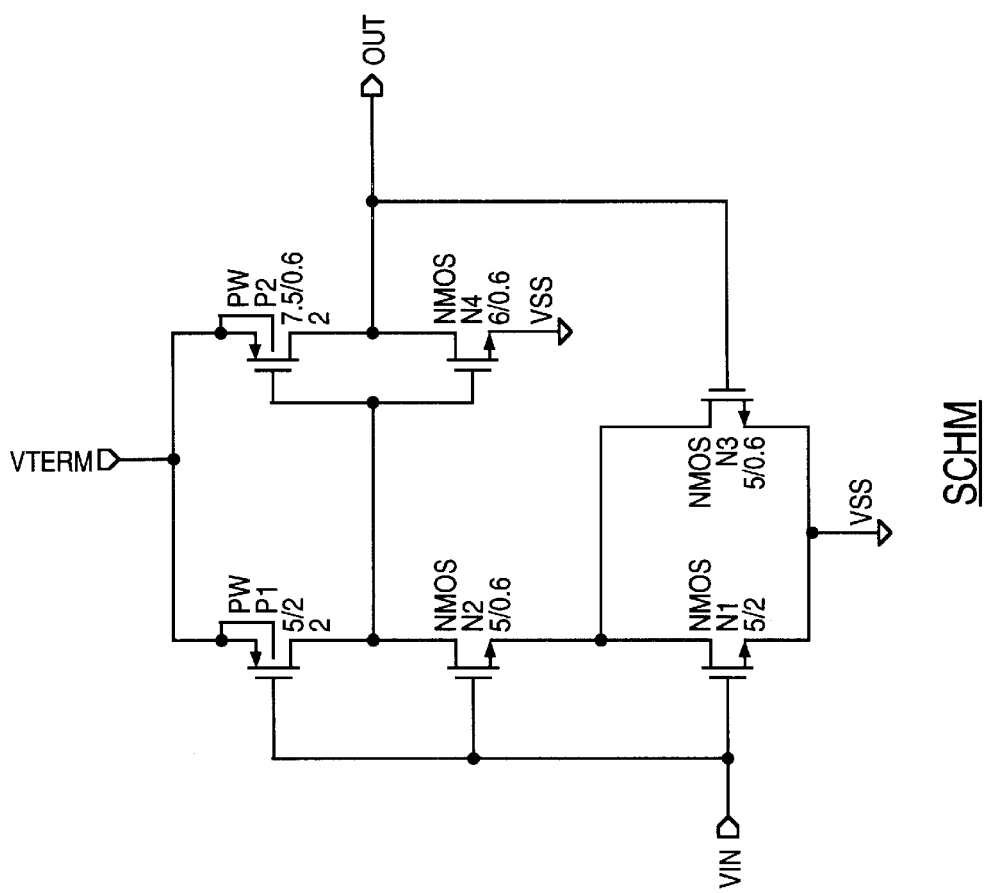
Figure 4M:
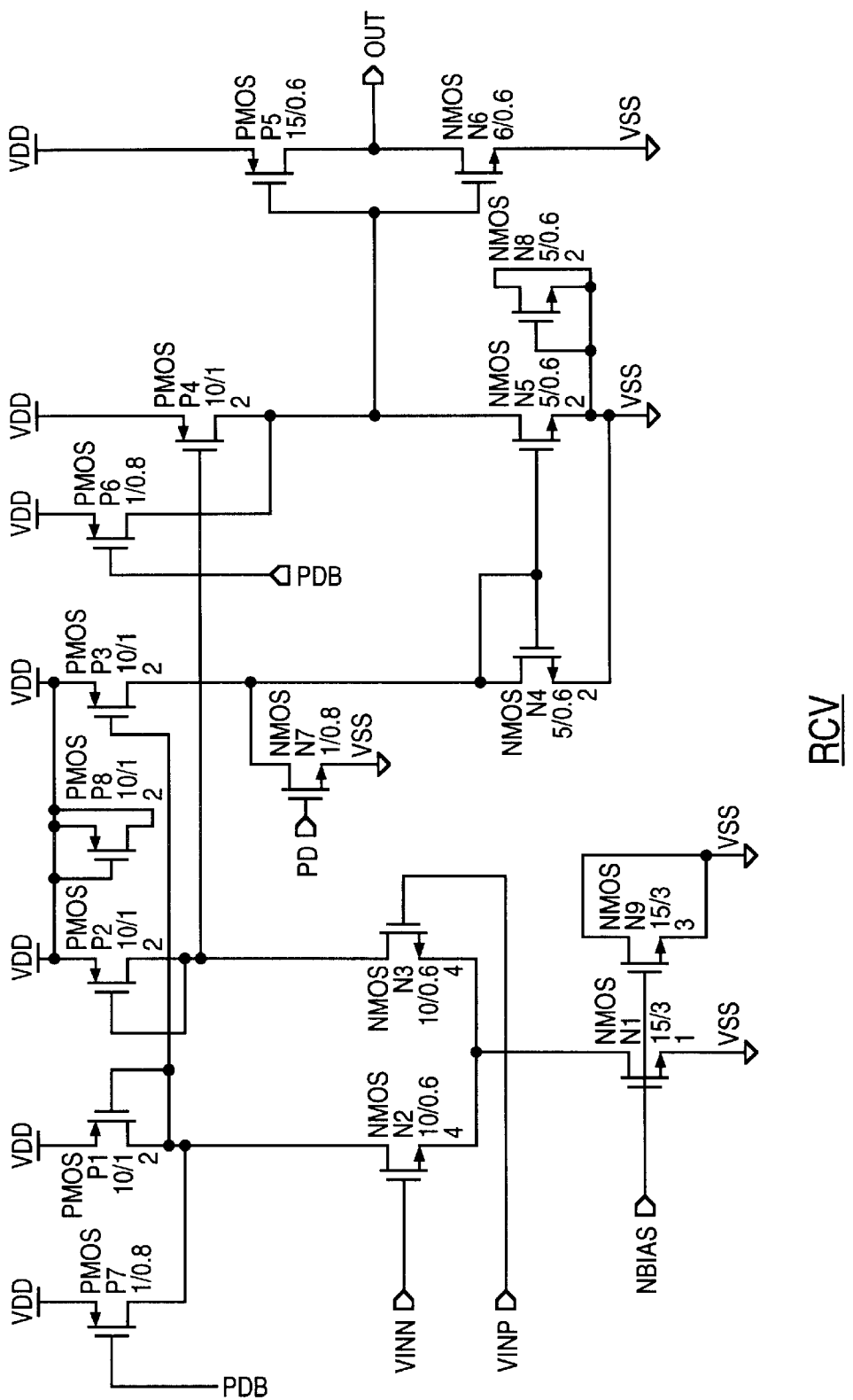

Referring to FIG. 4, a schematic diagram of USB transceiver 24 is shown. FIG. 4 comprises FIGS. 4A through 4M, FIG. 4A being an overall schematic diagram in partial block form of USB transceiver 24 and FIGS. 4B through 4M being expanded schematic diagrams of portions of USB transceiver 24. USB transceiver 24, as shown in FIG. 4, utilizes input signals VIF ($V_{IF}$), VP ($V_P$), VM ($V_M$), DP (D+), DM (D−), SPEED, OEN (OE#) and VTERM, as well as internally generated bias voltages and other signals, to generate output signals VP ($V_P$), VM ($V_M$), DP (D+), DM (D−) and RCV as previously described with respect to FIG. 3.

Although the present invention and its advantages have been described in detail, it should be understood that various changes, substitutions, and alterations can be made therein without departing from the spirit and scope of the invention as defined by the appended claims.

We claim:

1. A method performed by a universal serial bus transceiver, formed in a single integrated circuit package, for communicating data via a universal serial bus, the method comprising:

(a) receiving an externally generated reference voltage;

(b) receiving first and second data input signals from an external circuit, a logical HIGH level of said first and second data input signals corresponding to said reference voltage;

(c) generating first and second bus data output signals at a universal serial bus data signal level, in response to said first and second data input signals, for being applied to said universal serial bus, a logical HIGH universal serial bus data signal level being different from said logical HIGH level of said first and second data input signals;

(d) receiving first and second bus data input signals at said universal serial bus data signal level from said universal serial bus;

(e) generating at least one data output signal in response to said first and second bus data input signals for being applied to said external circuit, a logical HIGH level of said at least one data output signal corresponding to said reference voltage;

(f) receiving by a differential receiving amplifier said first and second bus data input signals from said universal serial bus;

(g) generating a differential receive output signal in response to said first and second bus data input signals, a logical HIGH level of said differential receive output signal corresponding to said reference voltage; and (h) applying said differential receive output signal to an output terminal of said integrated circuit package.

2. The method of claim 1 further comprising:

receiving a universal serial bus supply voltage on a universal serial bus supply line; and converting said universal serial bus supply voltage to a driving voltage for generating said first and second bus data output signals at said universal serial bus data signal level.

3. The method of claim 2 wherein act (c) comprises receiving, by a transmitting amplifier, said driving voltage for generating said first and second bus data output signals at said universal serial bus data signal level.

4. The method of claim 3 wherein an output of said transmitting amplifier is connected to an output terminal of said integrated circuit package.

5. The method of claim 1 wherein:

act (d) comprises receiving, by a first receiver, said first bus data input signal, and wherein act (e) comprises applying said reference voltage to said first receiver for generating said at least one data output signal; and wherein act (d) further comprises receiving, by a second receiver, said second bus data input signal, and wherein act (e) further comprises applying said reference voltage to said second receiver for generating said at least one data output signal.

6. The method of claim 1 wherein said reference voltage is a power supply voltage applied to said external circuit.

7. The method of claim 1 wherein act (c) comprises outputting, by a transmitting amplifier, said first and second bus data output signals on respective bus data output terminals of said integrated circuit package.

8. The method of claim 1 wherein act (e) comprises outputting, by a first receiving amplifier, said at least one data output signal on a first data output terminal of said integrated circuit package.

9. The method of claim 8 wherein act (e) further comprises outputting, by a second receiving amplifier, said at least one data output signal on a second data output terminal of said integrated circuit package.

10. The method of claim 1 wherein said first and second data input signals are complementary logic signals.

11. The method of claim 1 wherein said logical HIGH level of said differential receive output signal is substantially equal to said reference voltage.

12. The method of claim 1 wherein said logical HIGH level of said first and second data input signals is substantially equal to said reference voltage.

13. The method of claim 1 wherein said logical HIGH level of said at least one data output signal is substantially equal to said reference voltage.

14. A universal serial bus transceiver, formed in a single integrated circuit package, for communicating data via a universal serial bus, comprising:

a signal level transition circuit, said signal level transition circuit receiving an externally generated controller reference voltage and receiving first and second controller data input signals at a level corresponding to said controller reference voltage, said signal level transition circuit generating first and second bus data output signals at a universal serial bus data signal level in response to said first and second controller data input signals, said universal serial bus data signal level being different from said level corresponding to said controller reference voltage, said signal level transition circuit transmitting said first and second bus data output signals on said universal serial bus, said signal level transition circuit further receiving first and second bus data input signals at said universal serial bus data signal level from said universal serial bus, said signal level transition circuit generating at least one controller data output signal at said level corresponding to said controller reference voltage in response to said first and second bus data input signals, said signal level transition circuit for transmitting said at least one controller data output signal to a universal serial bus controller; and a differential receiving amplifier receiving said first and second bus data input signals from said universal serial bus, said transceiver generating a differential receive output signal based on an output from said differential receiving amplifier, said differential receive output signal being at said level corresponding to said controller reference voltage, said transceiver applying said differential receive output signal to an output terminal of said transceiver.

15. The transceiver of claim 14 wherein said signal level transition circuit receives a universal serial bus supply voltage on a universal serial bus supply line and converts said universal serial bus supply voltage to a driving voltage for generating said first and second bus data output signals at said universal serial bus data signal level.

16. The transceiver of claim 14 wherein said signal level transition circuit comprises a first receiver for receiving said first bus data input signal, said controller reference voltage received by said first receiver for generating said at least one controller data output signal.

17. The transceiver of claim 16 wherein said signal level transition circuit comprises a second receiver for receiving said second bus data input signal, said controller reference voltage received by said second receiver for generating said at least one controller data output signal.

18. The transceiver of claim 14 wherein said differential receiving amplifier receives said controller reference voltage for generating said differential receive output signal.

19. The transceiver of claim 14 wherein said controller reference voltage is externally generated and applied to a terminal of said integrated circuit package, said controller reference voltage being a power supply voltage for said universal serial bus controller.

20. The transceiver of claim 14 wherein said signal level transition circuit comprises a transmitting amplifier, said transmitting amplifier outputting said first and second bus data output signals on respective bus data output terminals of said integrated circuit package.

21. The transceiver of claim 14 wherein said signal level transition circuit comprises a first receiving amplifier, said first receiving amplifier outputting said at least one controller data output signal on a first controller data output terminal of said integrated circuit package.

22. The transceiver of claim 21 wherein said signal level transition circuit comprises a second receiving amplifier, said second receiving amplifier outputting said at least one controller data output signal on a second controller data output terminal of said integrated circuit package.

23. The transceiver of claim 14 wherein said signal level transition circuit comprises a first signal level transition circuit, for receiving said first and second controller data input signals, and a second signal level transition circuit, for receiving said first and second bus data input signals.

24. The transceiver of claim 23 wherein said signal level transition circuit comprises a third signal level transition circuit for generating said differential receive output signal.

25. The transceiver of claim 14 wherein said logical HIGH level of said first and second controller data input signals is substantially equal to said reference voltage.

26. The transceiver of claim 14 wherein said logical HIGH level of said at least one controller data output signal is substantially equal to said reference voltage.

27. The transceiver of claim 14 wherein said logical HIGH level of said differential receive output signal is substantially equal to said reference voltage.

* * * * *